US012172140B2

(12) United States Patent
Böttcher et al.

(10) Patent No.: US 12,172,140 B2
(45) Date of Patent: Dec. 24, 2024

(54) MIXING DEVICE HAVING A STIRRING ELEMENT

(71) Applicants: Sartorius Stedim Biotech GmbH, Göttingen (DE); Levitronix GmbH, Zürich (CH)

(72) Inventors: Lars Böttcher, Melsungen (DE); Marco Leupold, Göttingen (DE); Simon Topp-Manske, Lohfelden (DE); Thomas Holenstein, Umiken (CH); Thomas Nussbaumer, Zürich (CH); Robin Heese, Bebra (DE)

(73) Assignees: Sartorius Stedim Biotech GmbH (DE); Levitronix GmbH (CH)

( * ) Notice: Subject to any disclaimer, the term of this patent is extended or adjusted under 35 U.S.C. 154(b) by 893 days.

(21) Appl. No.: 17/276,087

(22) PCT Filed: May 17, 2019

(86) PCT No.: PCT/EP2019/062764

§ 371 (c)(1),
(2) Date: Mar. 12, 2021

(87) PCT Pub. No.: WO2020/052817

PCT Pub. Date: Mar. 19, 2020

(65) Prior Publication Data

US 2022/0040651 A1 Feb. 10, 2022

(30) Foreign Application Priority Data

Sep. 14, 2018 (DE) ..................... 10 2018 007 288.7

(51) Int. Cl.
*B01F 33/453* (2022.01)
*B01F 23/43* (2022.01)
(Continued)

(52) U.S. Cl.
CPC .......... *B01F 33/4531* (2022.01); *B01F 23/43* (2022.01); *B01F 23/53* (2022.01); *B01F 2035/352* (2022.01); *B01F 2101/44* (2022.01)

(58) Field of Classification Search
CPC ................ B01F 33/4531; B01F 33/452; B01F 33/4532; B01F 35/513; B01F 35/5312;
(Continued)

(56) References Cited

U.S. PATENT DOCUMENTS 3,572,651 A * 3/1971 Harker ................ B01F 33/4534 366/273
9,045,722 B2 * 6/2015 Reif ....................... C12M 27/02
(Continued)

FOREIGN PATENT DOCUMENTS

DE 202009006840 U1 * 8/2009 .......... B01F 13/0827
DE 102018007288 A1 * 3/2020 .......... B01F 13/0836
(Continued)

OTHER PUBLICATIONS

International Search Report and Written Opinion, mailed Sep. 4, 2019, for International Application No. PCT/EP2019/062764, 15 pages (with English translation).

*Primary Examiner* — Charles Cooley
(74) *Attorney, Agent, or Firm* — Klarquist Sparkman, LLP

(57) ABSTRACT

A mixing device having a stirring element can include: a container for receiving fluids and/or solids; and at least one rotatable stirring element for mixing the fluids and/or solids; wherein the stirring element comprises a first bearing element and a second bearing element which are arranged at or near opposite ends of the stirring element; wherein the first bearing element is mounted on a first face of the container and the second bearing element is mounted on an opposite second face of the container; wherein the first bearing element comprises at least one non-permanently magnetized
(Continued)

element such that it can be moved in rotation by externally induced reluctance forces, and wherein the second bearing element is mounted in a contactless manner by externally induced magnetic forces.

13 Claims, 5 Drawing Sheets

(51) Int. Cl.
*B01F 23/53* (2022.01)
*B01F 35/30* (2022.01)
*B01F 101/44* (2022.01)

(58) Field of Classification Search
CPC ................ B01F 35/60; B01F 2035/352; B01F 2101/22; B01F 2101/44; B01F 23/43; B01F 23/53; B01F 27/906
USPC ....................................... 416/3; 366/273–274
See application file for complete search history.

(56) References Cited

U.S. PATENT DOCUMENTS

| | | | | |
|---|---|---|---|---|
| 9,669,366 | B2 * | 6/2017 | Reif | B01F 35/513 |
| 11,819,813 | B2 * | 11/2023 | Schöb | B01F 35/60 |
| 12,048,671 | B2 * | 7/2024 | Gagne | B01F 27/71 |
| 2002/0145940 | A1 | 10/2002 | Terentiev | |
| 2007/0080595 | A1 | 4/2007 | Akiyama et al. | |
| 2017/0012491 | A1 | 1/2017 | Schöb et al. | |
| 2017/0312713 | A1 * | 11/2017 | Schöb | B01F 33/452 |
| 2017/0348655 | A1 | 12/2017 | Adams | |

FOREIGN PATENT DOCUMENTS

| | | | | |
|---|---|---|---|---|
| EP | 1 731 217 | A1 | 12/2006 | |
| EP | 3 097 974 | A1 | 11/2016 | |
| WO | WO 96/41409 | A1 | 12/1996 | |
| WO | WO-2020052817 | A1 * | 3/2020 | B01F 13/0836 |

* cited by examiner

MIXING DEVICE HAVING A STIRRING ELEMENT

CROSS REFERENCE TO RELATED APPLICATIONS

This is the U.S. National Stage of International Application No. PCT/EP2019/062764 filed May 17, 2019, which in turn claims the benefit of German Patent Application No. 10 2018 007 288.7, filed Sep. 14, 2018. The prior application is incorporated herein by reference in its entirety.

The present invention relates to a mixing device having a stirring element and to a mixing device system.

Various mixing devices are known from the prior art. For example, a mixing device can be a bioreactor in which, for example, fluids and/or solids are mixed for cultivating cell cultures. The mixing device usually has a container which can receive various fluids and/or solids. The container can be designed to be rigid or as a flexible bag. In particular, the container can be designed for reuse or as a disposable mixing device.

In order to achieve the desired mixing of the components contained in the container, the mixing device usually comprises a stirring element which, as a result of its rotation, achieves mixing of the contained components.

Depending on the size of the container or depending on the volume of the container, it may be sufficient for the stirring element to be located only in a lower region of the container. For larger containers, however, it is necessary for the stirring element to protrude further into the container in order to achieve uniform mixing of the component contained in the container.

It is therefore the object of the present invention to provide a stirring system for a mixing device which allows use in both disposable and reusable containers. In particular, the stirring system is to achieve reliable mixing independently of the container size.

This object is achieved by the features of the independent claims. Preferred embodiments of the invention are the subject matter of the dependent claims.

According to one aspect, a mixing device is provided which has a stirring element and comprises:

- a container for receiving fluids and/or solids; and
- at least one rotatable stirring element for mixing the fluids and/or solids;

wherein the stirring element comprises a first bearing element and a second bearing element which are arranged at or near opposite ends of the stirring element;

wherein the first bearing element is mounted on a first face of the container and the second bearing element is mounted on an opposite second face of the container; wherein the first bearing element comprises at least one non-permanently magnetized element in order to be able to be set in rotation by externally induced reluctance forces, and wherein the second bearing element is mounted in a contactless manner by externally induced magnetic forces.

The container is a container designed to receive fluids and/or solids. The fluids and/or solids can be mixed by the rotation of the stirring element contained in the container. The container can be designed to store and/or transport the medium, wherein continuous mixing takes place. The container can furthermore be designed to prepare a medium for a later process. The container can in particular be a bioreactor which is suitable for reuse or is provided only for one-time use. Reusable containers are usually made of glass or metal, while disposable containers are mostly made of flexible plastic, such as polyethylene. The container can in particular be used for biopharmaceutical applications. The container interior can be sterile and/or the mixing device can be used in a clean room.

The use of at least one non-permanently magnetized element in the stirring element makes it possible to produce a stirring element having a simple structure. Non-permanently magnetized elements in particular require no special processing so that the production or provision of a non-permanently magnetized element saves both time and money. Any drive elements which necessitate a penetration through the container wall can furthermore be avoided by means of externally induced reluctance forces which set the stirring element in rotation. Sterile conditions, which may prevail in the mixing device, can in particular be reliably maintained thereby. Because of the reluctance drive, it is furthermore not necessary to provide one or more permanent magnets or electrical windings for the drive of the stirring element on the stirring element or inside the mixing device, meaning that the mixing device can be provided with a stirring functionality reliably and cost-effectively. The mixing device can thus also be used as a disposable mixing device.

Elements made of highly permeable materials (e.g., with a relative permeability of $\mu r>4$, preferably $\mu r>100$, particularly preferably $\mu r>300$) and/or soft-magnetic materials, e.g., iron cores and/or electrical steel sheets or strips, are in particular suitable as non-permanently magnetized elements. Also suitable are iron, nickel, cobalt, alloys of the materials described above, alloys containing one of the materials described above and at least one further element, and ferrites.

Since the stirring element is mounted at two opposite ends, the stirring element can be mounted reliably even if the stirring element is used in a particularly large or tall container. Tilting of the stirring element during the stirring operation can thus be avoided.

Contactless mounting of the second bearing element by induced magnetic forces allows advantageous mounting of the stirring element in a sterile environment and/or of the mixing device in a clean room. In particular, due to such mounting, no abrasion takes place between the second bearing element and a holder which supports the second bearing element. Such a contactless mounting can furthermore also be used for high rotational speeds of the stirring element.

The stirring element preferably comprises a bearing rod, at the opposite ends of which the first and the second bearing elements are arranged, and wherein at least one wing element is arranged on the bearing rod and is designed to mix the fluids and/or solids in the container by rotation of the stirring element.

In a preferred embodiment, the bearing rod, the first bearing element, and/or the second bearing element are formed in one piece, or the bearing rod, the first bearing element, and/or the second bearing element are connected to one another in such a way that the stirring element can be set in rotation as a unit.

The first bearing element preferably has a base body which is designed to be substantially cylindrical.

Preferably, a lateral surface of the base body has at least one pair of pole projections which are arranged on opposite sides of the base body.

The term “lateral surface” is understood here to mean the face of the base body that extends around a stirring element axis of rotation.

Preferably, a non-permanently magnetized element is arranged in each of the pole projections.

In other words, the non-permanently magnetized elements in a pair of pole projections form magnetic poles upon which the externally induced reluctance forces act in order to set the stirring element in rotation.

As an alternative to said pole projections, in each of which a non-permanently magnetized element is arranged, the base body can comprise at least one pair of non-permanently magnetized elements which are arranged on opposite sides in the base body with respect to a stirring element axis of rotation.

The second bearing element is preferably at least partially formed from a ferromagnetic material.

In a preferred embodiment, the first and/or second bearing element are/is arranged outside the container.

In other words, the stirring element penetrates through the container so that the first and/or second bearing element is/are arranged outside the container.

The bearing element or the bearing rod can be sealed with respect to the wall of the container, through which the bearing element or the bearing rod penetrates, by means of mechanical seals, which are preferably equipped with a buffer fluid system.

The container preferably has at least one cylindrical wall recess which is designed to at least partially receive the first or second bearing element.

In other words, for each of the first and/or second bearing element, a cylindrical wall recess or wall protuberance can be formed, into which the respective bearing element is at least partially inserted. As a result, the corresponding bearing element is located inside the container, in contrast to the previously described arrangement of a bearing element outside the container.

It is possible for both bearing elements to be arranged inside or outside the container. However, one of the bearing elements can be arranged inside the container, while the other bearing element is arranged outside the container.

In particular for disposable containers, which are usually designed as flexible containers, an arrangement of the bearing elements inside the container is advantageous since this allows the flexible container to be held stably in an unfolded position.

An arrangement of the entire stirring element inside the container furthermore offers the advantage that the stirring element also does not have to penetrate through the container wall. As a result, sealing of the stirring element with respect to the container wall is not necessary and necessary sterility can be obtained in the container in a simple manner.

In a preferred embodiment, at least the wall face region of the container in which the wall recess is located is designed to be rigid.

In particular for disposable containers, which are usually of flexible design, reliable mounting of the stirring element can be ensured by means of a rigid region.

According to a further aspect of the invention, the underlying object is achieved by a mixing device system comprising:

a mixing device according to one of the embodiments described above;

a drive device for driving the stirring element; and a mounting device for mounting the second bearing element; wherein the drive device comprises:

a drive housing having at least two pairs of current-conductive drive coils arranged in pairs opposite one another with respect to a drive housing axis of rotation; and a drive control device which is designed for current to flow through the pairs of drive coils one after the other so that the stirring element of the mixing device can be driven by reluctance forces induced in the first bearing element; wherein the mounting device comprises:

a bearing housing having current-conductive bearing coils arranged around a bearing housing axis of rotation; and a bearing control device which is designed for current to flow through the current-conductive bearing coils in such a way that the second bearing element is held in a contactless manner in a predetermined position by the generated magnetic field;

wherein the stirring element axis of rotation, the drive housing axis of rotation, and the bearing housing axis of rotation are identical.

In other words, the drive device has at least two pairs of drive coils. The drive coils of a pair are arranged opposite one another with respect to a drive housing axis of rotation. The drive coils of the drive device are thus preferably arranged circularly. By means of a drive control device, current can be controlled in such a way that current flows through the pairs of drive coils one after the other. Preferably, current flows through the pairs clockwise or counterclockwise one after the other. The pair of drive coils through which current currently flows forms a magnetic field which can influence a stirring element in the mixing device once the stirring element is located in the generated magnetic field. The stirring element can be set in rotation by means of the reluctance forces induced by the magnetic field. In other words, a stirring element in a mixing device can only be set in rotation by forces acting externally on the stirring element. Any components that penetrate through the container wall can be avoided in the drive device so that sterile conditions in a mixing device are not adversely affected. The driving device furthermore does not have any rotating elements so that the risk of particle formation can be avoided, which is problematic particularly when the drive device is used in a clean room. The arrangement of the driving device in a dust-proof housing can thus be prevented.

The mounting device is designed to generate a magnetic field in which the second bearing element is located. The second bearing element is held in position only by the magnetic field. The bearing coils are preferably arranged around the second bearing element or the bearing coil and the second bearing element are located in one plane.

The mounting device preferably comprises at least one distance sensor, which is designed to measure the distance between the second bearing element and at least one bearing coil.

The distance sensor can be used to check whether the second bearing element is in its predetermined position. If the stirring element is tilted or if the second bearing element is not in its predetermined position, the bearing control device can regulate the current with respect to the individual bearing coils so that the magnetic field in which the second bearing element is located is adapted.

These and other objects, features, and advantages of the present invention become clearer by studying the following detailed description of preferred embodiments and the accompanying drawings. It is apparent that 25 even though embodiments are described separately, individual features may be combined to form additional embodiments.

Figure 6A:
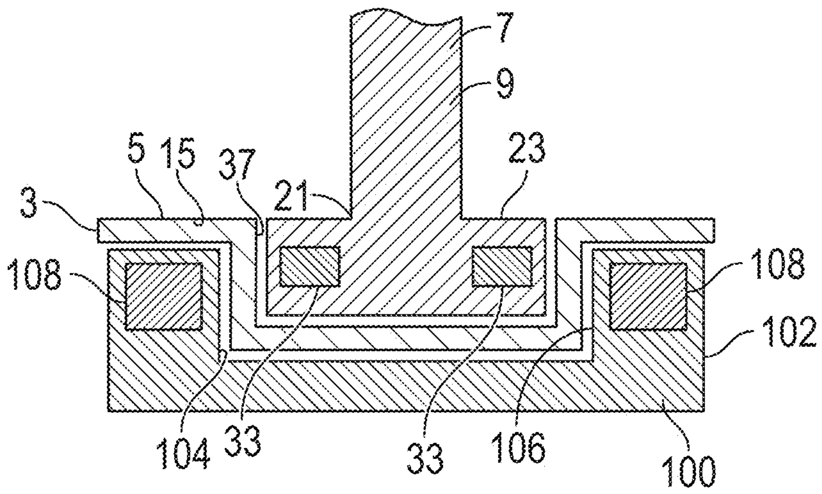
Figure 7:
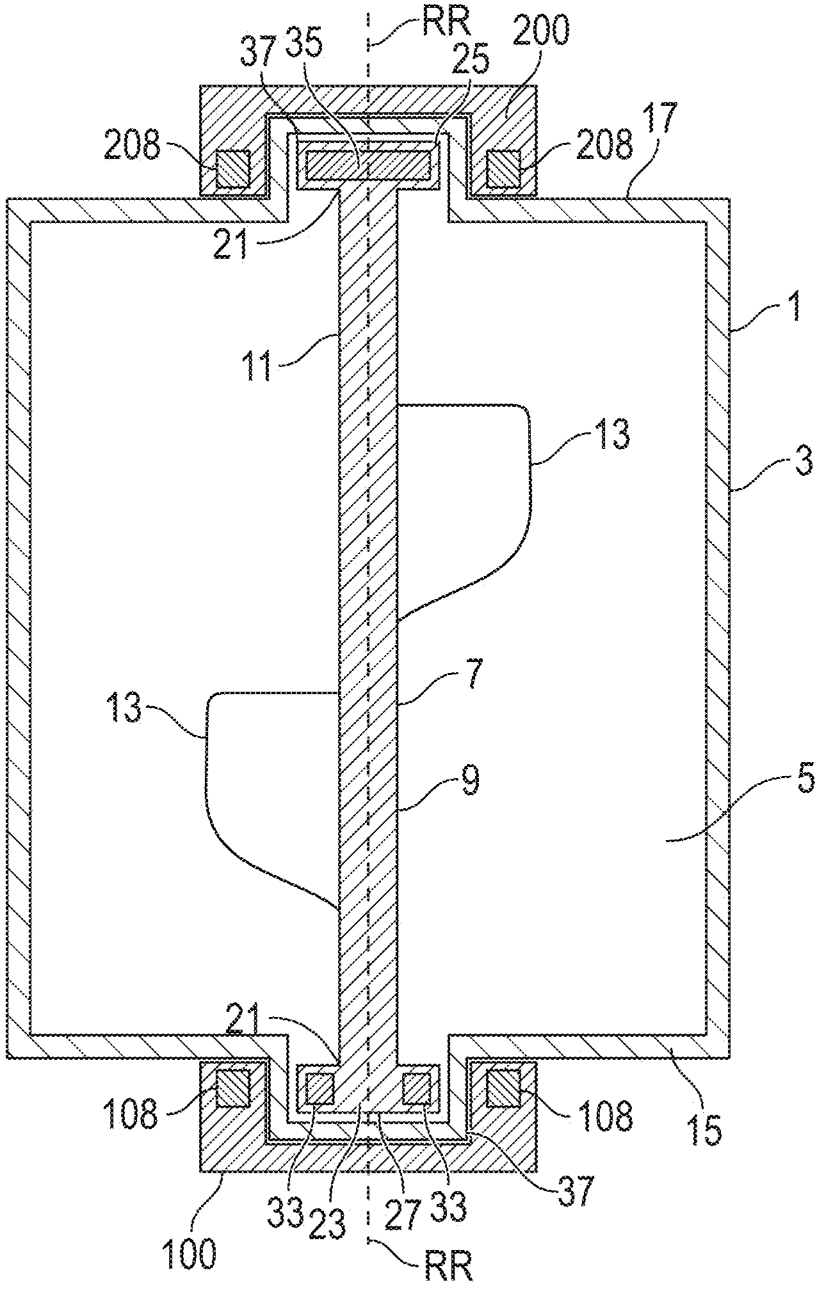

FIGS. 6*a*) and *b*) show details of a mixing device system according to a second embodiment in which the first and second bearing element are mounted inside the container; and FIG. 7 shows a sectional view of a of a mixing device system according to the second embodiment.

Figure 1:
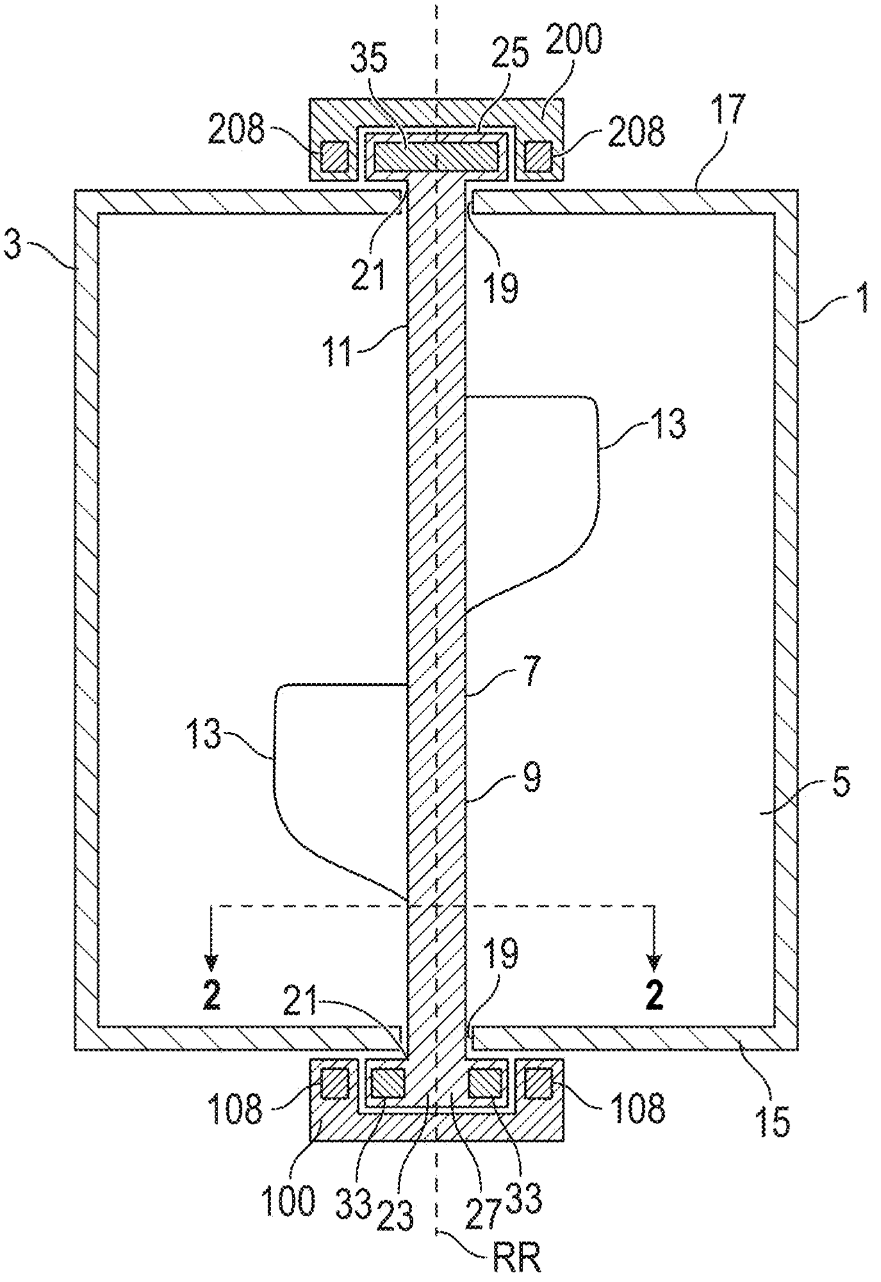
FIG. 1 shows a cross-sectional view of a mixing device system according to a first embodiment.

FIG. 1 shows a sectional view through a mixing device system 1 for mixing fluids and/or solids, preferably for biopharmaceutical applications.

The mixing device system 1 comprises a container 3 which is designed to receive the fluids and/or solids to be mixed. The container 3 is preferably designed as a closed container. The container 3 can be provided for reuse or for single use. In particular, the container 3 can be made of glass, metal, or plastic (e.g., polyethylene). Containers 3 which are designed for single use are preferably manufactured as bags which are characterized by an at least partially flexible container wall. Rigid containers 3 which are, for example, made of glass or metal, may have a removable lid. In particular for biopharmaceutical applications, it is preferred in this case that at least the interior 5 of the container 3 can be kept sterile in order to prevent contamination of the medium contained. For this purpose, the mixing device system 1 is preferably designed in such a way that at least the components of the mixing device system 1 that come into contact with the medium to be mixed can be sterilized.

The mixing device system 1 furthermore comprises a stirring element 7 which is arranged at least partially in the interior 5 of the container 3 and the rotation of which causes the medium located in the container 3 to be mixed.

The stirring element 7 comprises a bearing rod 9 which is preferably designed to be cylindrical. The bearing rod 9 extends along a stirring element axis of rotation RR and can be rotated about this axis of rotation. At least one wing element 13 or blade element protrudes from a lateral surface 11 of the bearing rod 9. If the bearing rod 9 has a plurality of wing elements 13, a plurality of wing elements 13 can be arranged on a plane around the bearing rod 9 and/or wing elements 13 can be arranged along the bearing rod on different planes with respect to the stirring element axis of rotation RR.

The wing elements 13 are preferably designed as substantially plate-shaped elements which are preferably arranged in a star shape around the stirring element axis of rotation RR. The distances between the individual wing elements 13 are preferably the same. However, it is also possible for the distances to vary from one another. The term "plate-shaped" is understood here to mean a substantially flat construction. However, "plate-shaped" is not limited to the wing elements 13 having to be designed to be flat. It is also possible for the wing elements 13 to be designed to be arcuate (e.g., in the form of a screw). The wing elements 13 may have rounded edges, as shown in FIG. 1, or angular edges. The wing elements 13 can in particular be oriented in parallel to the stirring element axis of rotation RR or be tilted by a specific angle to the stirring element axis of rotation RR.

The wing elements 13 can furthermore be arranged helically around the bearing rod 9. However, it is in particular preferred for the wing elements 13 to be positioned on the bearing rod 9 in such a way that they dip at least partially into the medium to be mixed. The wing elements 13 can be formed integrally with the bearing rod 9 or be fixed thereto. The bearing rod 9 and/or the wing element 13 can be made of plastic or metal.

The bearing rod 9 extends from a first face 15 of the container 3 to a second face 17 of the container 3, which is arranged opposite the first face 15 of the container 3. The first face 15 of the container 3 is preferably a bottom face of the container 3, while the second face 17 of the container 3 is a lid face of the container 3. As shown in FIG. 1, the bearing rod 9 penetrates through the respective face through a corresponding container opening 19. In order to be able to ensure sterility in the container 3 and/or to prevent the medium from escaping from the container 3, the container opening 19 is sealed with respect to the corresponding face 15, 17 of the container and to the bearing rod 9. This can take place, for example, by mechanical seals which are preferably equipped with a buffer fluid system. At opposite ends 21 of the bearing rod 9, a first and a second bearing element 23, 25 are arranged, by means of which the stirring element 7 is mounted on or in the container 3. The first bearing element 23 is preferably arranged at an end 21 of the bearing rod 9 that is located on or adjacent to the first face 15 of the container 3. The second bearing element 25 is preferably arranged at an end 21 of the container 3 that is located on or adjacent to the second face 17 of the container 3.

The first bearing element 23 has a base body 27 which is connected to the bearing rod 9 or is formed integrally with the bearing rod 9. The base body 27 is preferably designed to be cylindrical, wherein the diameter of the base body 27 is greater than the diameter of the bearing rod 9. As a result, the first bearing element 23 cannot slip into the interior 5 of the container 3.

Figure 2:
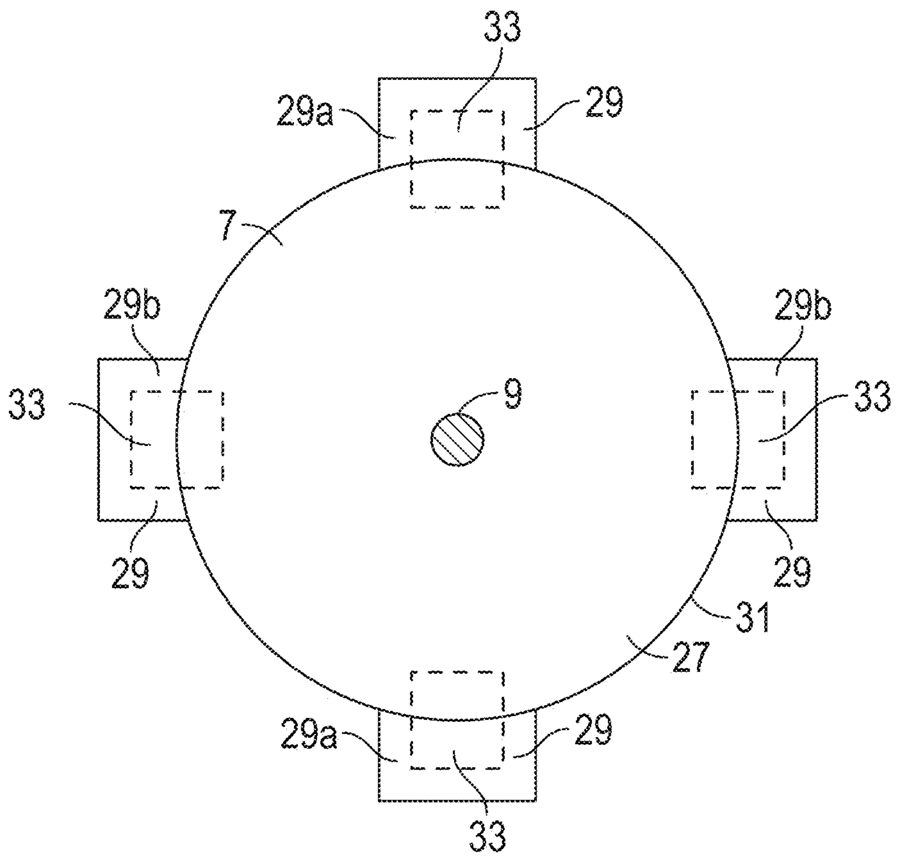
FIG. 2 shows a sectional view of the stirring element along the cut axis 2-2 with a view onto the first bearing element.

FIG. 2 shows a sectional view of the stirring element 7, wherein the stirring element 7 is cut at the cut axis 2-2. The first bearing element 23 is described in more detail with reference to this view.

In this view, it becomes clear that the preferably cylindrical base body 27 preferably furthermore has at least one pair of teeth or pole projections 29. These pole projections 29 are formed on a lateral surface 31 of the base body 27, wherein the pole projections 29 are preferably formed integrally with the base body 27.

The pole projections 29 of a pair of pole projections 29 are preferably arranged on substantially opposite sides of the base body 27. FIG. 2 shows an embodiment with two pairs of pole projections 29, wherein the first pair of pole projections is denoted by 29*a* and the second pair of pole projections is denoted by 29*b*. The distances between the individual pole projections 29 along the circumferential direction are preferably substantially equal. However, it is also possible for the distances between the pole projections 29 to vary from one another.

The base body 27, the wing elements 13, and the bearing rod 9 can preferably be made of plastic.

At least one non-permanently magnetized element 33 is preferably arranged in each of the pole projections 29. This non-permanently magnetized element 33 can be formed, for example, from a ferromagnetic material, such as iron. An element made of highly permeable materials (e.g., with a relative permeability of $\mu r>4$, preferably $\mu r>100$, particularly preferably $\mu r>300$) and/or soft-magnetic materials, e.g., an iron core and/or electrical steel sheet or strip (in particular according to the standard EN 10106 "Cold rolled non-oriented electrical steel sheet and strip delivered in the fully processed state" or in particular according to the standard EN 10106 "Grain-oriented electrical steel sheet and strip delivered in the fully processed state"), e.g., of cold-rolled iron-silicon alloys, is in particular suitable as non-permanently magnetized element. The non-permanently magnetized element 33 is in this case in particular arranged in the pole projections 29 in such a way that the non-permanently magnetized element 33 is externally covered by the material of the pole projection 29. In other words, the non-permanently magnetized elements 33 are embedded in the pole projections 29 so that none of the fluids or solids in the interior 5 of the container 3 can come into contact and react with the non-permanently magnetized material. If, in particular, the base body 27 is made of plastic, the non-permanently magnetized elements 33 can be extrusion-coated by the plastic.

In this case, the non-permanently magnetized element 33 can be arranged completely in the corresponding pole projection 29 or at least partially protrude into it.

However, it is also conceivable that the base body 27 has no pole projections and the non-permanently magnetized elements 33 are arranged inside the cylindrical base body 27. The arrangement of the non-permanently magnetized elements 33 inside the base body 27 is according to the embodiment with pole projections 29. The non-permanently magnetized elements 33 are in this case only recessed into the base body 27 with respect to the stirring element axis of rotation RR.

Figure 3:
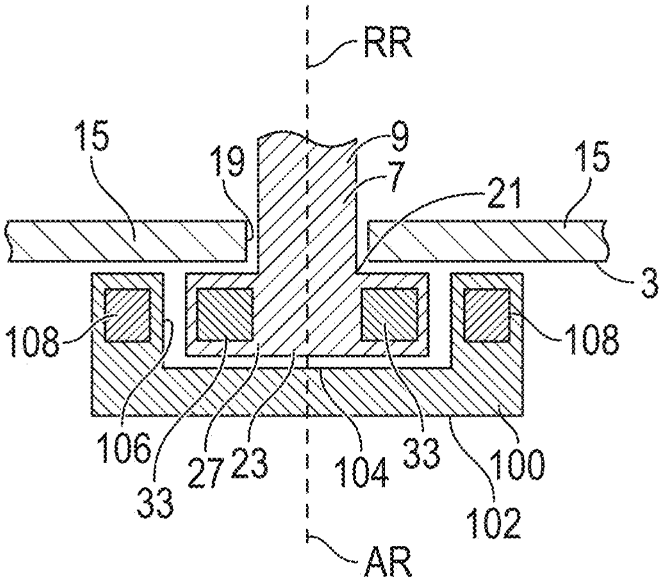
FIG. 3 shows a detail of the mixing device system from FIG. 1 with the first bearing element and a drive device.

FIG. 3 shows a detail of the mixing device system 1, wherein the stirring element 7 is cut along the stirring element axis of rotation RR through a pair of pole projections 29. The sectional view furthermore shows a partial region of the first face 15 of the container 3 of the mixing device system 1 on which the stirring element 7 is mounted.

FIG. 3 furthermore shows a section through a drive device 100, into which the first bearing element 23 of the stirring element 7 is inserted and by means of which the stirring element 7 can be set in rotation by reluctance.

The drive device 100 has a drive housing 102 with a drive housing recess 104 which is designed in such a way that the first bearing element 23 of the stirring element 7 can be inserted at least partially into the drive housing recess 104. The drive housing recess 104 is also preferably designed to be cylindrical with respect to a drive housing axis of rotation AR so that the drive housing axis of rotation AR coincides with the stirring element axis of rotation RR when the mixing device (container 3 and stirring element 7) is placed on the drive device 100.

The drive housing recess 104 has a recess wall 106 which surrounds the first bearing element 23 of the stirring element 7 at least partially around the drive housing axis of rotation AR or stirring element axis of rotation RR.

Figure 4:
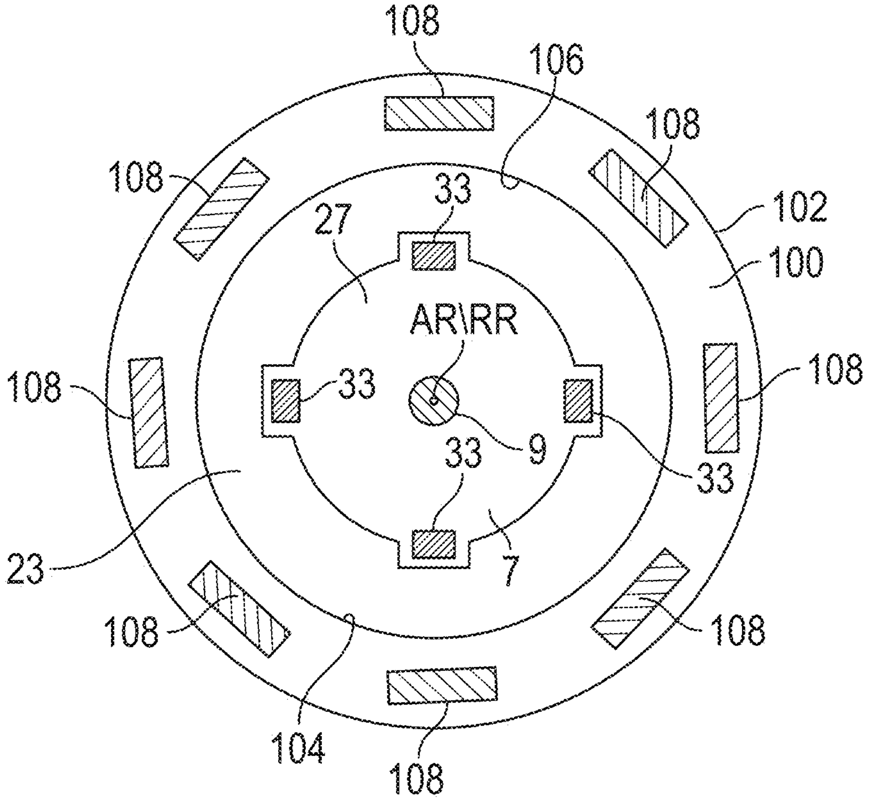
FIG. 4 shows FIG. 2 with the drive device.

For the sake of clarity, FIG. 4 shows a sectional view through the recess wall 106 and the stirring element 7 perpendicular to the drive housing axis of rotation AR or stirring element axis of rotation RR. For the sake of simplified illustration, the first face 15 of the container 3 is, however, not shown in this figure.

As shown in FIG. 4, at least two pairs of drive coils 108 are arranged in the recess wall 106 of the drive housing 102. The drive coils 108 of a pair are arranged substantially opposite one another with respect to the drive housing axis of rotation AR so that they are preferably arranged substantially cylindrically around the to the drive housing axis of rotation AR. FIG. 4 shows the special case of four pairs of drive coils 108. However, 2, 3, 5, 6, 7, 8, etc. pairs are also conceivable.

By means of a control device (not shown), the pairs of drive coils 108 can be controlled or regulated in such a way that current can flow through them sequentially. In other words, current flows through the pairs of drive coils 108 clockwise or counterclockwise one after the other with the aid of the control device.

When current flows through a pair of drive coils 108, a magnetic field forms which, in particular, also extends toward the drive housing axis of rotation AR or the stirring element axis of rotation RR. However, once current no longer flows through the pair of drive coils 208, this magnetic field disappears again. Since the control device, however, controls the pairs of drive coils 108 in such a way that current now flows through the adjacent pair of drive coils 108, a new magnetic field forms which is, however, shifted or offset clockwise or counterclockwise (depending on which adjacent pair of drive coils 108 current flows through) with respect to the drive housing axis of rotation AR. In other words, the magnetic field "migrates" with respect to the drive housing axis of rotation AR as a result of current sequentially flowing through the pairs of drive coils 108. The intensity of current is in each case preferably identical in order to achieve uniform rotation of the stirring element 7.

Due to the generated magnetic fields, the pairs of non-permanently magnetized elements 33, which are preferably located in the pairs of pole projections 29, act as poles.

Reluctance forces act on these poles due to the generated magnetic fields and cause the stirring element 7 to try to achieve, by rotating, a state in which the reluctance is lowest. This is achieved when the pair of non-permanently magnetized elements 33 located in the magnetic field is oriented with respect to the drive housing axis of rotation AR or the stirring element axis of rotation RR in one line with the pair of drive coils 108 through which current flows.

The stirring element 7 can in particular be driven according to the principle of a synchronous reluctance motor in which the synchronous reluctance motor has a wound multiphase stator (drive device 100 with drive coils 108) like an asynchronous machine. The stirring element 7 designed as a rotor is preferably not round but has distinct poles or projections 29. The drive is preferably controlled by means of a frequency converter according to the principle of the synchronous reluctance motor. The stirring element 7 can furthermore be driven according to the principle of an asynchronous motor with reluctance torque, wherein the motor is equipped like an asynchronous machine, in particular with a short-circuit cage, if a frequency converter is dispensed with. In this case, the drive runs as in an asynchronous motor to the vicinity of the asynchronous equilibrium rotational speed, wherein the reluctance effect then predominates and the rotor or the stirring element 7 rotates substantially synchronously with the rotating field. It is also conceivable to use a frequency-converter-fed synchronous reluctance motor to drive the stirring element 7. In addition, the stirring element 7 can be driven in particular according to the principle of a switched reluctance machine (switched reluctance motor (SRM or SR drive)), wherein the drive in this case, similarly to the other reluctance drives, in particular a different number of distinct teeth or projections on the rotor (stirring element 7) and stator. The stator teeth are in particular wound or provided with drive coils 108 which are alternately switched on and off, wherein the teeth with the energized windings or drive coils 108 each attract the nearest teeth of the rotor (poles 29) like an electromagnet and are switched off when (or shortly before) the teeth (poles 29) of the rotor (stirring element 7) are opposite the stator teeth (drive coils 108) attracting them. In this position, the next phase on other stator teeth or drive coils 108 is switched on, which attracts other teeth or projections (poles 29) on the rotor or stirring element 7. A switched reluctance motor in particular has three or more phases. However, there are also special forms with only two or one phase. In order to switch over at the correct point in time, the drive is generally provided with a rotor position sensor. However, it is also conceivable to use sensor-less control methods based on the stator current or the torque. Reluctance drives of this type are distinguished by high robustness and a low constructional outlay. Like asynchronous machines, they in particular do not produce any torque during rotation in the non-energized state. Residual magnetization often nevertheless leads to a small cogging torque in the currentless state. The stirring element 7 can furthermore be driven according to the principle of a reluctance stepper motor, wherein the reluctance stepper motor can in principle be constructed identically to a switched reluctance motor but, in contrast thereto, is switched without knowledge of the rotor position (stirring element 7).

In order to achieve continuous rotation of the stirring element 7, it is advantageous if the number of pairs of non-permanently magnetized elements 33 is less than the number of pairs of drive coils 108. This makes it possible to ensure that all pairs of non-permanently magnetized elements 33 are at no time oriented in one line with a corresponding pair of drive coils 108 with respect to the drive housing axis of rotation AR or the stirring element axis of rotation RR. It can thus be prevented that the state of least reluctance has already been achieved after one rotational movement and no further rotational movement can be attained.

The closer the pairs of drive coils 108 are arranged, the more jerky rotational movements can be avoided.

If the number of pairs of non-permanently magnetized elements 33 is less than the number of pairs of drive coils 108, the pair of non-permanently magnetized elements 33 will orient itself in one line with the pair of drive coils 108 through which current currently flows and which is currently closest to this pair of drive coils 108.

The remaining pairs of non-permanently magnetized elements 33 are then offset from the pairs of drive coils 108 or are not oriented in one line with any pair of drive coils 108. If the magnetic field is shifted by current flowing through a different pair of drive coils 108 by means of the control device (not shown), the reluctance force again orients the nearest pair of non-permanently magnetized elements 33 with the pair of drive coils 108 through which current flows. By changing the magnetic fields and the non-permanent magnetic elements 33 by means of reluctance forces, a rotational movement of the stirring element 7 is thus generated.

In this case, it is particularly advantageous that the driving device 100 can be arranged outside the container 3 so that the driving device 100 cannot contaminate the medium in the container 3. Consequently, the stirring element 7 is driven only by the reluctance force so that, furthermore, no abrasion takes place between the drive device 100 and the stirring element 7. This also contributes to avoiding contamination of the medium and to being able to use the mixing device system 1 in a clean room. The drive device 100 can furthermore be used multiple times, while the mixing device comprising the container 3 and the stirring element 7 can be designed as a disposable system.

Figure 5:
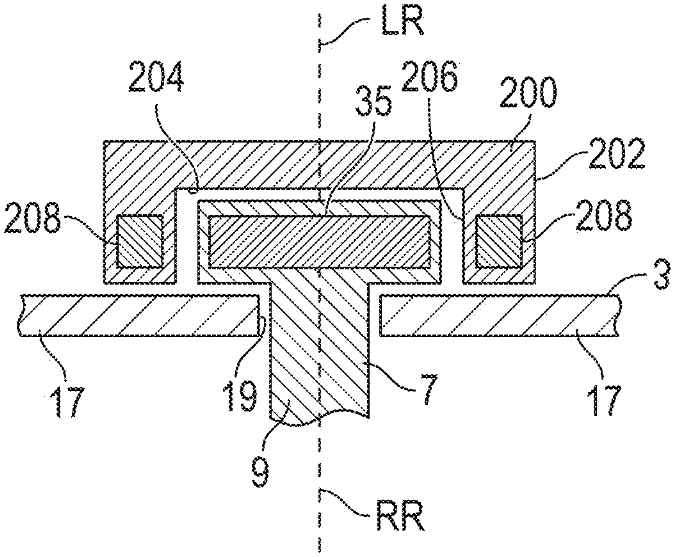
FIG. 5 shows a detail of the mixing device system from FIG. 1 with the second bearing element and a mounting device.

FIG. 5 furthermore shows a detail of the mixing device system 1, wherein the stirring element 7 is cut along the stirring element axis of rotation RR through the second bearing element 25. The sectional view furthermore shows a partial region of the second face 17 of the container 3 of the mixing device system 1 on which the stirring element 7 is mounted.

In addition, FIG. 5 shows a section through a mounting device 200 into which the second bearing element 25 of the stirring element 7 is inserted or can be inserted and by means of which the stirring element 7 can be mounted in a contactless manner by magnetic force.

The mounting device 200 has a bearing housing 202 with preferably one bearing housing recess 204 which is designed in such a way that the second bearing element 25 of the stirring element 7 can be inserted at least partially into the bearing housing recess 204. The bearing housing recess 204 is also preferably designed to be cylindrical with respect to a bearing housing axis of rotation LR so that the bearing housing axis of rotation LR coincides with the stirring element axis of rotation RR when the mixing device (container 3 and stirring element 7) is inserted in the mounting device 200.

The bearing housing recess 204 has a recess wall 206 which surrounds the second bearing element 25 of the stirring element 7 at least partially around the bearing housing axis of rotation LR or stirring element axis of rotation RR.

The second bearing element 25 comprises at least one ferromagnetic element 35. The second bearing element 25 can be completely made of ferromagnetic material, or ferromagnetic material can be embedded in the second bearing element 25. With regard to the latter variant, the second bearing element 25 can, for example, be made of plastic and the at least one ferromagnetic element 35 is extrusion-coated by the plastic. If a plurality of ferromagnetic elements 35 are embedded in the second bearing element 25, they can be arranged to be at a distance from one another and/or to abut one another. The ferromagnetic elements 35 may furthermore be arranged regularly or irregularly in the second bearing element 25. The sizes of the ferromagnetic elements 35 may in particular be identical or different from one another.

The second bearing element 25 is preferably also designed to be cylindrical, similarly to the first bearing element 23, wherein the diameter of the second bearing element 25 is preferably also greater than the diameter of the bearing rod 9 so that the second bearing element 23 can be prevented from penetrating or slipping into the interior 5 of the container 3.

A plurality of bearing coils 208 are arranged in the bearing housing 202 and are arranged circularly around the bearing housing axis of rotation LR. In this case, the bearing coils 208 can be arranged at regular and/or irregular distances from one another.

The bearing coils 208 are connected to a bearing control device (not shown) which is designed to regulate or control the current flowing through the individual bearing coils 208. Each individual bearing coil 208 can preferably be regulated or controlled separately. This includes being able to, with the aid of the bearing control device, cause current to flow through a bearing coil 208 or not. In addition, the current intensity flowing through the individual bearing coil 208 can be adjusted by the bearing control device.

In this case, the bearing control device is designed such that it regulates or controls the current flowing through the bearing coils 208 such that the second bearing element 25 in a predetermined position holds to the mounting device 200 in a contactless manner. However, the mounting permits a rotational movement of the stirring element 7 about the stirring element axis of rotation RR.

In order to hold the second bearing element 25 in the predetermined position, a preadjusted current can flow through the individual bearing coils 208, wherein the current intensity between the individual bearing coils 208 can vary.

However, it may be necessary to readjust the current intensity with respect to the individual bearing coils 208 in order to correct deviations of the second bearing element 25 from its predetermined position. For this purpose, at least one distance sensor (not shown) can be provided on the mounting device 200, such as on the bearing housing 202, and/or on the second bearing element 25. This distance sensor is designed to monitor the distance between the bearing housing 202 or a bearing coil 208 and the second bearing element 25. If the measured distance is greater or less than the predefined correct distance, the current intensity of the individual bearing coils 208 can be readjusted with the aid of the bearing control device.

As a result of the described mounting of the stirring element 7 in the container 3, the stirring element 7 can be held securely in its intended position or can be mounted on the container 3. Mixing by the stirring element 7 can be ensured even for large containers 3 in which large quantities of a medium are to be mixed.

An embodiment which is particularly suitable for rigid containers 3 has previously been shown with reference to the preceding figures. It has in particular been shown that both the first bearing element 23 and the second bearing element 25 can be located outside the container 3. However, it is also possible to mount said bearing elements 23, 25 inside the container 3 and to nevertheless ensure secure mounting of the stirring element 7. Such an arrangement is suitable both for flexible containers 3, such as single-use bags, and for rigid containers. The embodiment shown below is characterized in particular in that the stirring element 7 also does not penetrate through the container wall. Sterility in the container 3 can thus advantageously be ensured.

Figure 6B:
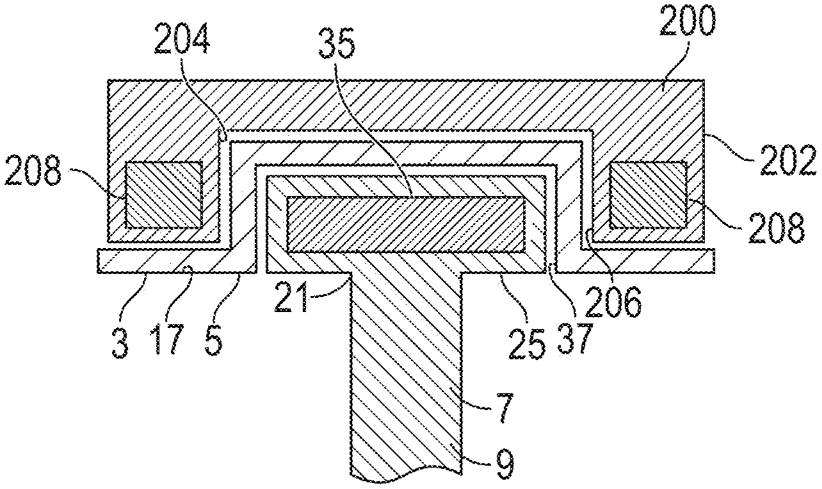

FIG. 6*a*) shows a detail of a mixing device system 1 in which the first bearing element 23 is arranged in the container 3. FIG. 6*b*) shows a further detail of a mixing device system 1 in which the second bearing element 25 is arranged in the container 3. In both cases, the detail is a sectional view, wherein the cut axis runs along the stirring element axis of rotation RR.

FIGS. 6*a*) and 6*b*) show that the container 3 has a corresponding wall recess 37 or wall protuberance in the first and second face 15, 17 of the container 3. The wall recess 37 is preferably designed to be substantially cylindrical so that the first and second bearing element 23, 25 can each be inserted at least partially into the wall recess 37. For this purpose, the diameter of the wall recess 37 is greater than the diameter of the first and second bearing element 23, 25. The diameter of the wall recess 37 is in particular to be selected in such a way that rotation of the stirring element 7 in the wall recess 37 is possible.

If the container 3 is flexible, it is preferred that the container 3 is designed at least in the region of the wall recess 37 to be rigid or have increased stiffness in comparison to the other regions. This can be carried out in that the wall thickness in this partial region is designed to be thicker. Alternatively or additionally, a reinforcing layer having substantially rigid properties can be applied to this partial region on the first and/or second face 15, 17 of the container 3 or can be fixed thereto or arranged thereon. This allows improved mounting of the first and second bearing element 23, 25 in the corresponding wall recess.

The drive device 100 and the mounting device 200 are designed to be identical to the preceding figures so that the description of these devices with respect to the preceding figures apply here accordingly.

The difference between the embodiment from FIG. 6 and the preceding figures, however, is that the container wall is arranged between the first and second bearing element 23, 25 and corresponding to the drive device 100 and the mounting device 200. Since, in the second embodiment, the stirring element 7 is located completely inside the container 3, it is possible to prevent elements from penetrating through the container wall. Sealing between the stirring element 7 and the container 3 at the container opening 19 can thus be avoided.

Although it is shown in FIGS. 6*a*) and 6*b*) that both bearing elements 23, 25 is arranged inside the container 3, there is also the possibility that only one bearing element is arranged inside the container 3, while the other bearing element is arranged outside the container 3.

If a stirring element 7, the bearing elements 23, 25 of which are arranged inside the container 3, is used in a flexible container 3, the stirring element 7 has an additional supporting effect for the container 3. In other words, the flexible container 3 can be held in a preferably unfolded position.

FIG. 7 shows a sectional view through a mixing device system according to the second embodiment. The first and second bearing element 23 and 25 are mounted according to FIGS. 6*a*) and 6*b*).

The mixing device systems described with reference to FIGS. 1 to 7 show first bearing elements 23 which can be set in rotational motion by externally induced reluctance forces. In contrast, the second bearing element 25 of the stirring element 7 is mounted by externally induced magnetic forces. In other words, the first bearing element 23 is used to drive the stirring element 7, while the second bearing element 25 is used to additionally mount the stirring element 7.

However, in order to be able to transmit more force to the stirring element 7 and thus to be able to achieve higher rotational speeds, it is also conceivable for the second bearing element 25 to be designed identically to the first bearing element 23. In this embodiment, the second bearing element 25 can then be driven identically to the first bearing element 23. This embodiment is in particular advantageous for media having a higher viscosity.

LIST OF REFERENCE SIGNS

1 Mixing device system
3 Container
5 Interior of the container
7 Stirring element
9 Bearing rod
11 Lateral surface of the bearing rod
13 Wing elements
15 First face of the container
17 Second face of the container
19 Container opening
21 End of the bearing rod
23 First bearing element
25 Second bearing element
27 Base body of the first bearing element
29 Pole projection
29*a* First pair of pole projections
29*b* Second pair of pole projections
31 Lateral surface of the base body
33 Non-permanently magnetized element
35 Ferromagnetic element
37 Wall recess

100 Drive device
102 Drive housing
104 Drive housing recess
106 Recess wall of the drive device
108 Drive coil
200 Mounting device
202 Bearing housing
204 Bearing housing recess
206 Recess wall of the mounting device
208 Bearing coil
AR Drive housing axis of rotation
LR Bearing housing axis of rotation
RR Stirring element axis of rotation

The invention claimed is:

1. A mixing device having a stirring element, comprising:
a flexible container for receiving fluids and/or solids; and
at least one rotatable stirring element for mixing the fluids and/or solids;
wherein the stirring element comprises a first bearing element and a second bearing element which are arranged at or near opposite ends of the stirring element;
wherein the first bearing element is mounted on a first face of the container and the second bearing element is mounted on an opposite second face of the container;
wherein the first bearing element comprises at least one non-permanently magnetized element in order to be able to be set in rotation by externally induced reluctance forces,
wherein the second bearing element is mounted in a contactless manner by externally induced magnetic forces, and
wherein the flexible container includes at least one cylindrical wall recess which is designed to at least partially receive the second bearing element.

2. The mixing device according to claim 1, wherein the stirring element comprises a bearing rod, at the opposite ends of which the first and second bearing element are arranged, and
wherein at least one wing element is arranged on the bearing rod and is designed to mix the fluids and/or solids in the flexible container by rotation of the stirring element.

3. The mixing device according to claim 1, wherein the bearing rod, the first bearing element, and/or the second bearing element are formed in one piece, or
wherein the bearing rod, the first bearing element, and/or the second bearing element are connected to one another in such a way that the stirring element can be set in rotation as a unit.

4. The mixing device according to 1, wherein the first bearing element has a base body which is designed to be substantially cylindrical.

5. The mixing device according to claim 4, wherein a lateral surface of the base body has at least one pair of pole projections which are arranged on opposite sides of the base body.

6. The mixing device according to claim 5, wherein a non-permanently magnetized element is arranged in each of the pole projections.

7. The mixing device according to claim 4, wherein the base body comprises at least one pair of non-permanently magnetized elements arranged on opposite sides in the base body with respect to a stirring element axis of rotation.

8. The mixing device according 14, wherein the second bearing element is at least partially formed from a ferromagnetic material.

9. The mixing device according 14, wherein the first and/or second bearing element are/is arranged outside the flexible container.

10. The mixing device according to claim 1, wherein the flexible container has at least one cylindrical wall recess which is designed to at least partially receive the first bearing element.

11. The mixing device according to claim 10, wherein at least the wall face region of the flexible container in which the wall recess is located is designed to be rigid.

12. A mixing device system comprising:
a mixing device according to claim 1;
a drive device for driving the stirring element; and
a mounting device for mounting the second bearing element;
wherein the drive device comprises:
a drive housing having at least two pairs of current-conductive drive coils arranged in pairs opposite one another with respect to a drive housing axis of rotation (AR); and
a drive control device which is designed for current to flow through the pairs of drive coils one after the other so that the stirring element of the mixing device can be driven by reluctance forces induced in the first bearing element;
wherein the mounting device comprises:
a bearing housing having current-conductive bearing coils arranged around a bearing housing axis of rotation (LR); and
a bearing control device which is designed for a current to flow through the current-conductive bearing coils in such a way that the second bearing element is held in a contactless manner in a predetermined position by the generated magnetic field;
wherein the stirring element axis of rotation (RR), the drive housing axis of rotation (AR), and the bearing housing axis of rotation (LR) are identical.

13. The mixing device system according to claim 12, wherein the mounting device comprises at least one distance sensor which is designed to measure the distance between the second bearing element and at least one bearing coil.

* * * * *